US011120074B2

(12) United States Patent
Dow et al.

(10) Patent No.: US 11,120,074 B2
(45) Date of Patent: Sep. 14, 2021

(54) STREAMLINING CITATIONS AND REFERENCES

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Maurice M. Materise, Poughkeepsie, NY (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 15/370,803

(22) Filed: Dec. 6, 2016

(65) Prior Publication Data
US 2018/0157658 A1 Jun. 7, 2018

(51) Int. Cl.
*G06F 16/50* (2019.01)
*G06F 16/583* (2019.01)
*G06K 9/00* (2006.01)

(52) U.S. Cl.
CPC ..... *G06F 16/5854* (2019.01); *G06K 9/00469* (2013.01)

(58) Field of Classification Search
CPC ............. G06K 9/0061; G06K 9/00469; G06K 9/6857; G06T 1/0007; G06F 17/30259; G06F 3/017; G06F 3/04883; G06F 3/04842; G06F 2203/04806; G06F 16/5854; G06F 3/04845; G06F 16/24573; G06F 16/93; G06F 16/382; G06F 40/169; H04N 5/23222; G02B 2027/014; Y10S 707/917
See application file for complete search history.

(56) References Cited

U.S. PATENT DOCUMENTS

| 8,385,691 B2* | 2/2013 | Shuster ............. G06F 17/30265 382/305 |
| 8,805,814 B2* | 8/2014 | Zijlstra ................. G06F 16/951 707/707 |
| 9,063,641 B2 | 6/2015 | Patterson et al. |
| 2002/0156760 A1* | 10/2002 | Lawrence ............. G06F 16/951 |
| 2006/0044613 A1* | 3/2006 | Hirose ............... G11B 20/1883 358/1.16 |
| 2006/0218492 A1* | 9/2006 | Andrade ................. G06F 17/24 715/234 |
| 2007/0239704 A1* | 10/2007 | Burns ................... G06F 16/951 |
| 2008/0141182 A1 | 6/2008 | Barsness et al. |

(Continued)

OTHER PUBLICATIONS

Carroll, "Welcome to the best place to read books", Dec. 22, 2014, 10 Pages, Glose.com, URL: https://glose.com/.

(Continued)

*Primary Examiner* — Merilyn P Nguyen
(74) *Attorney, Agent, or Firm* — Cantor Colburn LLP; Teddi Maranzano

(57) ABSTRACT

Embodiments are directed to a computer-implemented method, computer system, and computer program product for analyzing image data to create a reference. The method includes receiving a first image data. The image data is saved in a database. The image data is analyzed to determine a source of the first image data. A reference is created based on the analyzing.

13 Claims, 4 Drawing Sheets

(56) References Cited

U.S. PATENT DOCUMENTS

| | | | |
|---|---|---|---|
| 2008/0218812 A1* | 9/2008 | Wolf | H04N 1/00326 358/474 |
| 2009/0171905 A1* | 7/2009 | Garcia | G06F 16/382 |
| 2010/0092088 A1* | 4/2010 | Roman | G06F 16/93 382/182 |
| 2010/0278453 A1 | 11/2010 | King | |
| 2011/0078041 A1* | 3/2011 | Barker | G06Q 30/02 705/26.25 |
| 2011/0219017 A1* | 9/2011 | Cui | G06F 16/00 707/769 |
| 2012/0013759 A1* | 1/2012 | Chen | H04N 5/23219 348/222.1 |
| 2012/0233152 A1* | 9/2012 | Vanderwende | G06F 16/382 707/722 |
| 2013/0036383 A1* | 2/2013 | Yuan | G06F 3/0482 715/815 |
| 2013/0290299 A1 | 10/2013 | Hoareau et al. | |
| 2014/0047332 A1 | 2/2014 | Liu et al. | |
| 2014/0229481 A1* | 8/2014 | Qureshi | G06F 16/24 707/736 |
| 2015/0286896 A1* | 10/2015 | Watanabe | G06F 16/5854 382/103 |
| 2016/0041961 A1* | 2/2016 | Romney | G06F 40/131 715/230 |
| 2016/0203360 A1* | 7/2016 | Alvarez | G06K 9/00355 345/156 |
| 2017/0285345 A1* | 10/2017 | Ferens | G06T 11/00 |

OTHER PUBLICATIONS

Nicoll, et al., "How to Use Highlights and Notes on Your Kindle Paperwhite", Dec. 24, 2012, 5 Pages, dummies.com, URL: http://www.dummies.com/how-to/content/how-to-use-highlights-and-notes-on-your-kindle-pap.html.

* cited by examiner

STREAMLINING CITATIONS AND REFERENCES

BACKGROUND

The embodiments described herein relate in general to the field of computing. More specifically, the embodiments described herein relate to systems and methodologies for streamlining the creation of citations using a computing device.

When a user is writing a research paper (such as for school or for a scholarly publication), the user typically has citations to reference material used during the creation of the research paper. Finding the correct citation and citation format for an article can become tedious.

SUMMARY

Embodiments are directed to a computer-implemented method of analyzing images. The method includes receiving a first image data. The image data is saved in a database. The image data is analyzed to determine a source of the first image data. A reference is created based on the analyzing.

Embodiments are further directed to a computer system of analyzing images. The system includes a memory and a processor system communicatively coupled to the memory. The processor is configured to perform a method that includes receiving a first image data. The image data is saved in a database. The image data is analyzed to determine a source of the first image data. A reference is created based on the analyzing.

Embodiments are further directed to a computer program product for analyzing images. The computer program product includes a computer-readable storage medium having program instructions embodied therewith. The program instructions are readable by a processor system to cause the processor system to perform a method that includes receiving a first image data. The image data is saved in a database. The image data is analyzed to determine a source of the first image data. A reference is created based on the analyzing.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
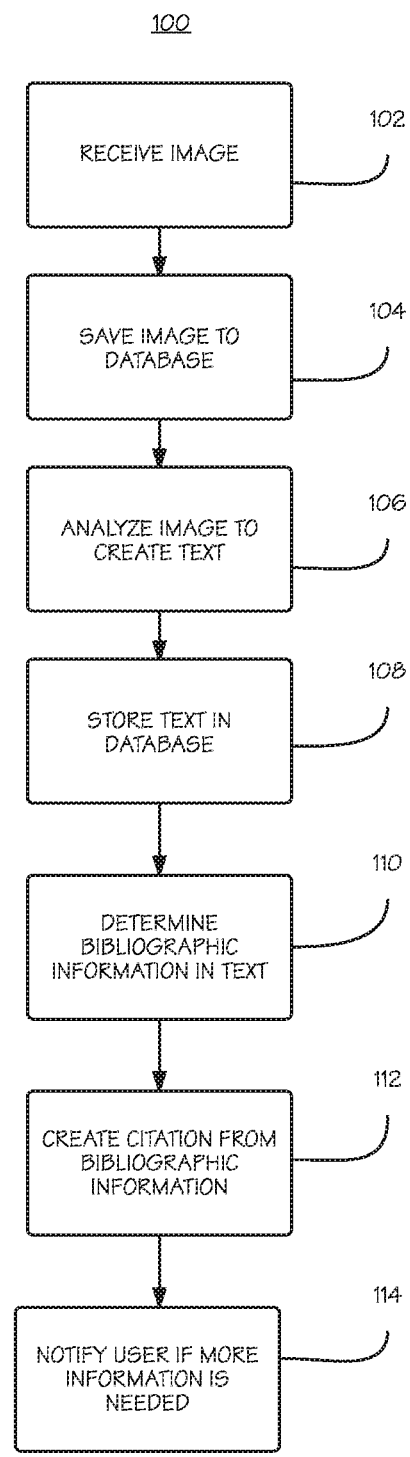
FIG. 1 depicts a flow diagram illustrating the operation of an exemplary embodiment.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the immediately present application, including the corresponding features and combinations of features depicted in the figures amount to significantly more than implementing a method of creating citations. Additionally, at least the features and combinations of features described in the immediately preceding paragraphs, including the corresponding features and combinations of features depicted in the figures go beyond what is well understood, routine and conventional in the relevant field(s).

As discussed above, there are situations in which a user wants to create references. When writing a paper, such as a research paper or term paper for school, a journal article, or the like, there is often a desire to refer to sources used in the creation of the article or paper. A reference allows people who review the article to determine the veracity of an author's findings. References also allow a reader to review background material regarding an article.

An issue that exists is that references can become cumbersome to deal with, especially when a user is referring to many different sources. Citations to references themselves come in a variety of different formats. For example, there is the Bluebook format used for legal writing; the American Psychological Association (APA) style used in education, psychological, and sciences; the Modern Language Association (MLA) style used in the humanities; and the Chicago style used in business, history, and fine arts. An additional issue is that, for some citation formats, a citation in the body of the text is different from a citation in the bibliography or reference section of the text.

An exemplary citation using the APA format in the reference section can be as follows: Anderson, A. K. (2005). Affective influences on the attentional dynamics supporting awareness. *Journal of Experimental Psychology: General*, 134(2), 258-281. Doi:10.1037/0096-3445.134.2.258. In the body of the text, this article would be referred to as Anderson (2005). Other citation formats can also have multiple citation formats for the same article. Each citation format is different, so the same article can be cited in different manners, depending on if the article uses MLA, APA, or Chicago format. In general, the citation of a journal or magazine article includes one or more of the following: a title of the article, one or more authors of the article, a year of publication of the article, and a name of the publication (magazine name or journal name). The citation of a book includes one or more of the following, one or more authors of the book, a title of the book, and the year of publication of the book.

Not only does a user need to know which format to use, the user must then gather all the information for each source used in his research. There can be a large amount of information gathered for each source, including the name of the author(s); name of the article; name of the magazine, journal, or book; year of publication; page numbers; publisher information; unique identifiers (such as a Digital Object Identifier (DOI) or an international standard book number (ISBN)) and the like. The user must ensure that he has all of that information to create a bibliography or other listing of sources. If the user is quoting from a reference, ensuring that the quotation is accurate can also be tedious and time-consuming.

Embodiments of the present invention address the above-described issues by using a novel method and system to allow a user to automatically create references and save information. A user can capture an image of the source. A system, method, or computer-program product containing an embodiment can analyze image data to extract text, extract citation information, create a citation, and store the created citation. In addition, segments of the source can be saved. A user can utilize gestures to indicate the areas of the reference to be saved.

Figure 3:
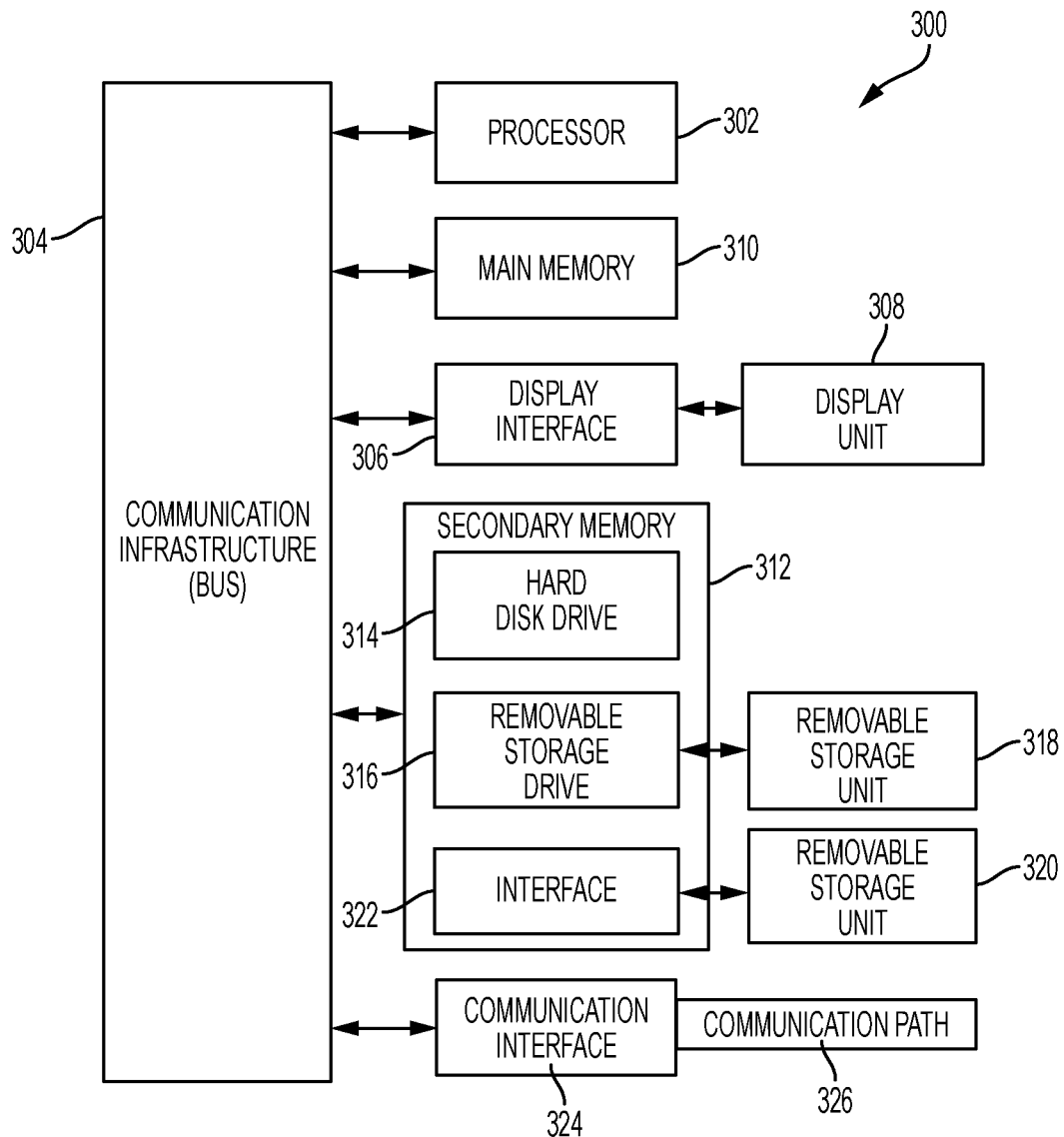
FIG. 3 depicts a computer system capable of implementing hardware components of one or more embodiments.

Method 100 is an overview of a general method to accomplish the above-described tasks. A flowchart illustrating method 100 is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In some embodiments, portions of method 100 can be implemented by system 300 (FIG. 3).

The system receives image data from a user (block 102). The image data can be captured in one of a variety of different manners. A user can use a scanner or camera in order to capture such an image. In some embodiments, a system 300 can have an integrated camera. In such an embodiment, system 300 can be in the form factor of a smartphone.

The image data is saved to a database (block 104) such that the image data is later accessible, either by an embodiment or by the user. The image data is analyzed by the system to determine the information in the image (block 106). This can involve a variety of different actions. For example, optical character recognition (OCR) can be performed on the image to transform the image into text.

Once the image data has been transformed into text, a variety of different actions can be performed on it. The text can be saved to the database (block 108). The database can later be accessed by the user in order to copy and paste the text as needed. The image data or text can be analyzed to determine the title or other relevant bibliographic information (such as a title of an article, title of journal, page number, and the like) (block 110). Certain typefaces can indicate that certain text is the title of an article or a book. The title can be submitted to one of a variety of different services to determine and save a correct reference for the article or book (block 112). The reference can be in the form of a citation. Exemplary services to create citations can include Citefast, Citeseer, and Amazon. Such services can include access to an extensive database that provides full citation information even if only one of the title, author, and publication name is known. The correct citation that is stored in the database can later be accessed by the user when writing his article.

Page numbers can be determined from the image. For example, page numbers are typically located in a top or bottom corner of a page. If numbers are present in a corner of the image, the numbers can be retrieved and placed into a citation.

If it is determined that there is not enough information to create a citation, the user can be notified to capture more information (block 114). If the captured images do not contain a title, page number, or other bibliographic information, it might not be possible to find a correct citation for the source. In such an instance, the user can be notified that he should capture additional information. In an embodiment used with a smartphone app, the notification can be via a notification system integrated with the smart phone (such as a pop-up or alarm). In some embodiments, the user can be notified via text message or via email. Thereafter, the user can capture the title page of the article or book to ensure that the correct citation can be created. In addition, a user can be able to make a notation that the image is related to another image in the database.

While the above described embodiment describes the creation of a citation from image data, other embodiments are also possible. For example, the image data can be a physical object or a work of art. If the image data is of a painting, for example, the reference could be the title of the painting and the artists.

Other embodiments are not limited to the creation of references from image data. For example, a user can be typing the name of an article, book, legal case, or the like. Thereafter, a footnote, endnote, or other reference can be created to refer to the work. For example, if the user types in Marbury v. Madison, a footnote can be created in the correct format: *Marbury v. Madison,* 5 U.S. 137 (1803). If the user types in Anderson (2005), a footnote can be created in the correct format: Anderson, A. K. (2005). Affective influences on the attentional dynamics supporting awareness. *Journal of Experimental Psychology: General,* 134(2), 258-281. Doi:10.1037/0096-3445.134.2.258.

Figure 2:
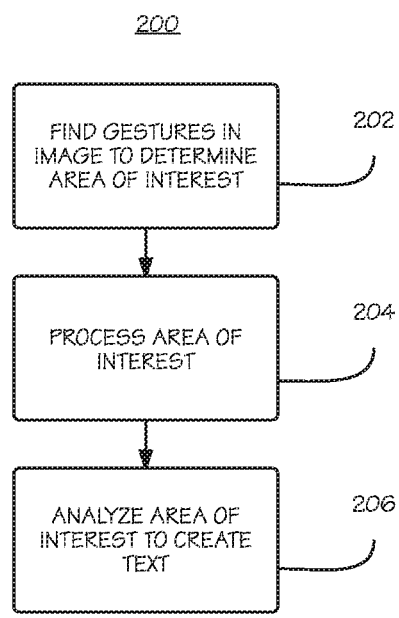
FIG. 2 depicts a flow diagram illustrating the operation of an exemplary embodiment.

Method 200 is an overview of a general method to perform another embodiment of the above-described tasks. A flowchart illustrating method 200 is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In some embodiments, portions of method 200 can be implemented by system 300 (FIG. 3).

In another embodiment, additional aspects of the image can be analyzed. More specifically, the image can be further analyzed to determine if there are any user gestures in the image (block 202). In some embodiments, a user can indicate portions of an image to be processed. For example, a user can form an L-shape using his thumb and forefinger. Thereafter, the user can place the L-shape next to a paragraph of interest. Other gestures can be used, such as pointing at a block of text.

The hand can be detected using one of a variety of different techniques. For example, differences in focal distances, the presence of flesh tones, or the presence of a certain shape can indicate that a user is making a gesture. In some embodiments, instead of using a hand gesture, the user can use another type of indicia. In some embodiments, a target can be printed and used to indicate the area of interest. In such an embodiment, an analysis of the image will find the target and process the area of interest. The target can contain a predefined image, such as a crosshair, bar code, QR code, or the like, that indicates to an embodiment the location of the area of interest.

The system analyzes the area of interest and processes the area (block 204). For example, instead of processing an entire page of a reference, only the area indicated by the user is processed.

The processed area of interest is processed to determine the text located in the area of interest (block 206). For example, OCR can be performed only on the area of interest to transform the image into text. Thereafter, processing can occur such as displayed in FIG. 1.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. Computer system 300 can have one of a variety of different form factors, such as a desktop computer, a laptop computer, a tablet, an e-reader, a smartphone, a personal digital assistant (PDA), and the like.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
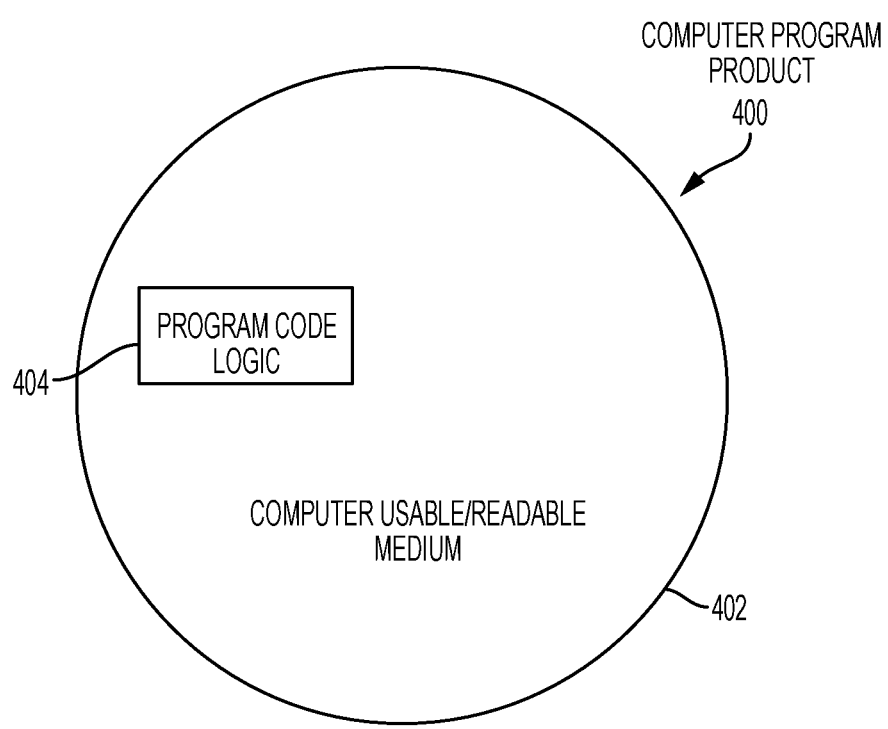
FIG. 4 depicts a diagram of a computer program product according to one or more embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method of analyzing images, the method comprising:
   receiving, by a processor, a first image data captured by a user;
   saving, by the processor, the first image data in a database;
   analyzing, by the processor, the first image data to determine a source of the first image data, the analyzing comprising:
      transforming the first image data to text;
      extracting bibliographic information from the text;
      determining whether the extracted bibliographic information can be used to create a citation;
      requesting, by the processor, additional information from the user in response to determining that the extracted bibliographic information cannot be used to create a citation; and
      in response to determining that the extracted bibliographic information can be used to create a citation, sending the bibliographic information to a citation service,
   receiving citation information from the citation service in response to the sending;
   creating, by the processor based at least in part on the analyzing and the received citation information, a reference in a citation format that describes a source of the text; and
   storing the reference in the citation format in the database, wherein the reference in the citation format can later be accessed by the user.

2. The computer-implemented method of claim 1, wherein storing the reference in the citation format in the database further comprising:
   placing the reference in the citation format into the database.

3. The computer-implemented method of claim 2, further comprising:
   allowing the user to remotely access the database.

4. The computer-implemented method of claim 1, further comprising issuing a notification if a reference cannot be created using the first image data.

5. The computer-implemented method of claim 1, further comprising storing a relationship between the first image data and a second image data in the database.

6. The computer-implemented method of claim 1, wherein the citation format is chosen from a set consisting of: American Psychological Association (APA) style, Modem Language Association (MLA) style, Bluebook style, and Chicago style.

7. A computer system for analyzing images, the system comprising:
   a memory; and
   a processor system communicatively coupled to the memory;
   the processor system configured to:
   receive a first image data captured by a user;
   save the first image data in a database;
   analyze the first image data to determine a source of the first image data, the analyzing comprising:
      transforming the first image data to text;
      extracting bibliographic information from the text;
      determining whether the extracted bibliographic information can be used to create a citation;
      requesting additional information from the user in response to determining that the extracted bibliographic information cannot be used to create a citation; and
      in response to determining that the extracted bibliographic information can be used to create a citation, sending the bibliographic information to a citation service, receiving citation information from the citation service in response to the sending;
   create, based at least in part on the analyzing and the received citation information, a reference in a citation format that describes a source of the text; and
   store the reference in the citation format in the database, wherein the reference in the citation format can later be accessed by the user.

8. The computer system of claim 7, wherein storing the reference in the citation format in the database further comprising: placing the reference in the citation format into the database.

9. The computer system of claim 8, wherein the processor is further configured to:
   allow the user to remotely access the database.

10. The computer system of claim 7, wherein the processor is further configured to issue a notification if a reference cannot be created using the first image data.

11. The computer system of claim 7, wherein the processor is further configured to store a relationship between the first image data and a second image data in the database.

12. The computer system of claim 7, wherein the citation format is chosen from a set consisting of: American Psychological Association (APA) style, Modem Language Association (MLA) style, Bluebook style, and Chicago style.

13. A computer program product for analyzing images comprising:
   a computer-readable storage medium having program instructions embodied therewith, the program instructions readable by a processor system to cause the processor system to:
   receive a first image data captured by a user;
   save the first image data in a database;
   analyze the first image data to determine a source of the first image data, the analyzing comprising:
      transforming the first image data to text;
      extracting bibliographic information from the text;
      determining whether the extracted bibliographic information can be used to create a citation;
      requesting additional information from the user in response to determining that the extracted bibliographic information cannot be used to create a citation; and
      in response to determining that the extracted bibliographic information can be used to create a citation, sending the bibliographic information to a citation service, receiving citation information from the citation service in response to the sending;
   create, based at least in part on the analyzing and the received citation information, a reference in a citation format that describes a source of the text; and
   store the reference in the citation format in the database, wherein the reference in the citation format can later be accessed by the user.

* * * * *